(12) United States Patent
Vaughn

(10) Patent No.: US 12,090,016 B2
(45) Date of Patent: Sep. 17, 2024

(54) DISAPPEARING TOOTH AND OBJECT CONTAINER

(71) Applicant: Paris Vaughn, Woodbridge, VA (US)

(72) Inventor: Paris Vaughn, Woodbridge, VA (US)

( * ) Notice: Subject to any disclaimer, the term of this patent is extended or adjusted under 35 U.S.C. 154(b) by 451 days.

(21) Appl. No.: 17/358,112

(22) Filed: Jun. 25, 2021

(65) Prior Publication Data

US 2022/0409350 A1    Dec. 29, 2022

(51) Int. Cl.
*A61C 19/00* (2006.01)

(52) U.S. Cl.
CPC ................................ *A61C 19/008* (2013.01)

(58) Field of Classification Search
CPC ............ A63F 9/08; B65D 81/36; A63J 21/00
USPC ........ 206/457, 581, 1.5, 235, 317, 449, 455, 206/461, 6.1, 752, 818, 823; 220/522, 220/840, 259.1, 4.22–4.23, 505, 531, 761, 220/835; 132/294–295, 315–316; 472/71, 63, 69, 57, 73, 74; 446/13, 134, 446/219, 73, 76, 8
See application file for complete search history.

(56) References Cited

U.S. PATENT DOCUMENTS

| | | | |
|---|---|---|---|
| 1,762,501 A * | 6/1930 | Brehmer | A63J 21/00 273/153 R |
| 2,458,969 A * | 1/1949 | Wilson | A63H 33/26 446/134 |
| 4,557,476 A * | 12/1985 | Kato | A63J 21/00 70/289 |
| 4,565,364 A * | 1/1986 | Kondo | A63J 21/00 472/69 |
| 4,633,215 A * | 12/1986 | Anders | B60Q 1/503 116/28 R |
| 4,821,751 A * | 4/1989 | Chen | A45D 33/24 206/823 |
| 5,005,697 A * | 4/1991 | Jimbo | A45C 13/02 206/823 |
| 5,282,765 A * | 2/1994 | Suzuki | A63H 33/22 472/63 |
| 5,394,989 A * | 3/1995 | Delson | A61C 19/008 206/83 |
| 5,449,324 A * | 9/1995 | Sugawara | A63J 21/00 472/69 |
| 5,484,092 A * | 1/1996 | Cheney | B60R 9/00 312/222 |
| 5,526,927 A * | 6/1996 | McLemore | A01K 97/06 206/315.11 |
| 5,549,515 A * | 8/1996 | Kondo | A63J 21/00 472/63 |
| 5,553,712 A * | 9/1996 | Tisbo | B42F 17/18 206/455 |

(Continued)

*Primary Examiner* — Chun Hoi Cheung
*Assistant Examiner* — Brijesh V. Patel
(74) *Attorney, Agent, or Firm* — The Rapacke Law Group, P.A.; Andrew S. Rapacke

(57) ABSTRACT

A disappearing tooth container is disclosed, including a container having an upper container component and a lower container component. The container is dimensioned to receive an item and a prize. An upper container insert is applied to the upper container component to form a hidden compartment to store the prize. A lower container insert is applied to the lower container component, the lower container insert includes a hollow concavity to retain the item to permit the surreptitious exchange of the item and the prize.

20 Claims, 7 Drawing Sheets

(56) References Cited

U.S. PATENT DOCUMENTS

| | | | | |
|---|---|---|---|---|
| 5,555,671 | A * | 9/1996 | Voight | A01K 97/06 206/315.11 |
| 5,638,957 | A * | 6/1997 | Brasier | B65D 43/165 220/531 |
| D423,249 | S * | 4/2000 | Hawang | D6/667 |
| 6,527,113 | B2 * | 3/2003 | Blake | A01K 97/06 206/315.11 |
| 7,147,128 | B1 * | 12/2006 | Verrault | B65D 83/0805 221/34 |
| 9,131,761 | B2 * | 9/2015 | Kalyanpur | A45D 40/22 |
| 10,154,944 | B2 * | 12/2018 | Sierson | A47K 10/32 |
| 2002/0129538 | A1 * | 9/2002 | Buzzell | A01K 97/06 43/55 |
| 2003/0096066 | A1 * | 5/2003 | Clark | D04D 7/10 428/4 |
| 2003/0111374 | A1 * | 6/2003 | Mendoza | B65D 81/36 446/76 |
| 2006/0060488 | A1 * | 3/2006 | Rodriguez | B65D 51/245 206/457 |
| 2006/0226164 | A1 * | 10/2006 | Graham | A45D 33/26 206/581 |
| 2007/0039849 | A1 * | 2/2007 | Rodriguez | B65D 5/4262 206/457 |
| 2009/0145782 | A1 * | 6/2009 | Mumma | A45C 11/16 206/6.1 |
| 2009/0272659 | A1 * | 11/2009 | Kaiser | A45D 33/20 132/316 |
| 2020/0187476 | A1 * | 6/2020 | Noel, Sr. | A01K 97/06 |

* cited by examiner

DISAPPEARING TOOTH AND OBJECT CONTAINER

TECHNICAL FIELD

The embodiments generally relate to containers that allow for the surreptitious exchange of a tooth or other object in exchange for money or another prize.

BACKGROUND

In North America, there are key figures that create the fabric of childhood mythology; Santa Claus, Easter Bunny, and the Tooth Fairy are among the most recognized and revered characters. The Tooth Fairy stands out for several reasons. The Tooth Fairy is celebrated across religious and cultural boundaries, uniting races, genders, ages, and backgrounds in a safe and simple ritual that highlights a childhood milestone. The Tooth Fairy, a fantasy figure of early childhood, is the central character around the story that describes what children should do when a baby tooth is "lost". Folklore states that when a child loses a baby tooth, he or she should place that tooth underneath their pillow or on the bedside table, in hopes that the Tooth Fairy will visit during the night to replace the lost tooth with a reward, typically a small monetary gift or some other token or prize.

Parents who choose to participate in this tradition with and for their children can face several challenges with regards to the actual exchange of the tooth for the prize. Three of many challenges will be described here. One challenge is that children can be light sleepers. Light sleepers make it difficult to enter bedrooms undetected. Even when the tooth is placed in a location other than under the bed pillow, there is a risk of the child being disturbed and awaking during the process. The risk is compounded when, there are multiple individuals that share the same room or bed, the child is away from home, or under the care of a grandparent or individual who is not the primary caregiver. Another challenge involves the possibility of losing the lost tooth. Primary teeth are small by nature when compared to adult teeth. Placing a small tooth under a pillow offers no guarantee that the tooth will remain in place, especially when considering the normal movements of a child during the sleep cycles. A third challenge is that as most parents/caregivers decide to wait until late at night to make the exchange, there is a risk that the parent/caregiver may forget or fall asleep before completing the process, resulting in major disappointment the next morning.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments provided herein relate to a disappearing tooth and/or object container is disclosed, including a container having an upper container component and a lower container component. The container is dimensioned to receive an item and a prize. A removable upper container insert is applied to the upper container component to form a hidden compartment to store the prize. A removable or fixed lower container insert is applied to the lower container component, the lower container insert includes a hollow concavity to retain the item to permit the surreptitious exchange of the item and the prize. The primary goal is to give the illusion that the Tooth Fairy or other individual has secretly exchanged a tooth or other item placed in the container with a prize.

Parents or caregivers that choose to participate in the tradition of exchanging a lost tooth for a prize or money while the participant is sleeping may face several challenges. Primary teeth can be very small and hard to find if a child places their tooth under a pillow or other hard to reach location. This challenge may be compounded if a child is a light sleeper. The goal for most parents or caregivers that participate in this tradition is to exchange the lost tooth with money or prize without the participant waking up. My solution is a tooth and object container that allows for the secret exchange of a lost tooth with a prize or money. This may alleviate the parent or caregiver of having to sneak back into a child's room in order to make the exchange while the child is sleeping. This is done by having a container with a hidden compartment inside that allows for the storage of money or other prizes. The hidden compartment may be held together via several hidden magnets or other types of fasteners, such as mechanical fasteners known in the arts, embedded inside and outside the container. When the outside magnets or other types of fasteners are removed the upper hidden compartment opens revealing the money or other prize previously hidden. This will result in the recently placed tooth to become hidden in the new lower hidden compartment.

In one aspect, the container includes a decorative ornaments engaged with a top surface of the container.

In one aspect, the decorative ornament is releasably engaged via a magnet or other type of fastener.

In one aspect, the container includes a locking mechanism to selectively close the upper and lower container components.

In one aspect, the upper and lower container components are provided with a liner.

In one aspect, the upper container insert is retained in position via one or more magnets or other types of fasteners.

In one aspect, the lower container insert is permanently affixed to the lower container component.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
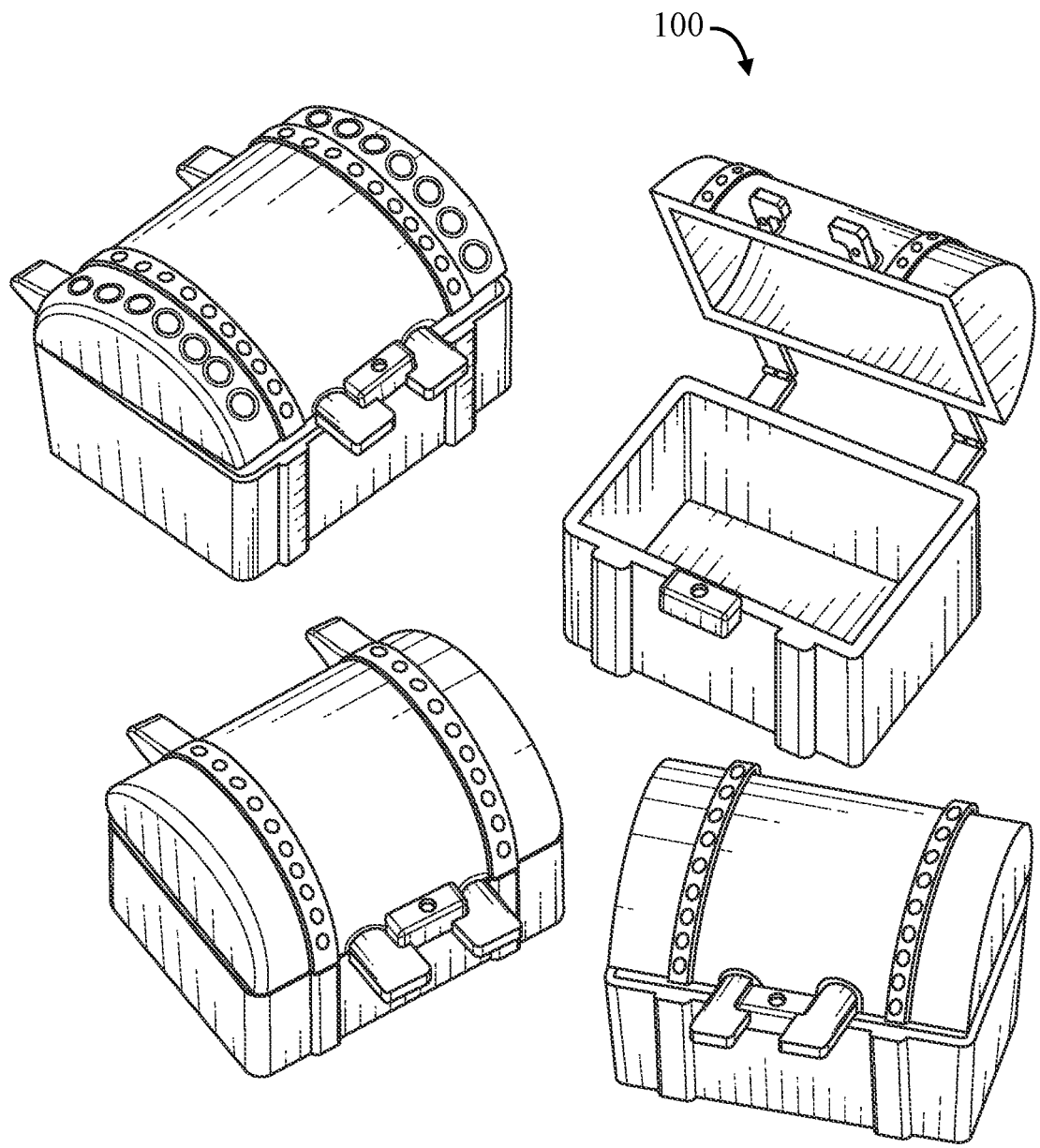
FIG. 1 illustrates a tooth container which may be provided by a dentist to put lost primary teeth in, according to some embodiments.

The specific details of the single embodiment or variety of embodiments described herein are set forth in this application. Any specific details of the embodiments are used for demonstration purposes only, and no unnecessary limitation or inferences are to be understood therefrom.

Before describing in detail exemplary embodiments, it is noted that the embodiments reside primarily in combinations of components related to the system. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a container that allows for the for the surreptitious exchange of a tooth or other object and exchange for money or another prize. The container is prepared in advance by placing money or another prize inside the container's hidden compartment, with or without the participant knowing. When a tooth or other object is placed in the container, the container can be closed to allow for the hidden compartment to open and reveal the money or other prize when the container is reopened. The container eliminates the need to return later to exchange a tooth or other object for a prize and also eliminates the need to unknowingly interact with the tooth in close proximity to the participant.

As used herein, the term "item" is used to describe an object (e.g., a tooth) which is placed within the container in exchange for a prize.

As used herein, the term "prize" is used to describe a reward (e.g., money) which can be exchanged for an item. One skilled in the arts will readily understand that while the example of a lost tooth is placed within the container in exchange for money, the container may be used for various other exchanges.

FIG. 1 illustrates the tooth container 100 that is traditionally given by a dentist to put lost primary teeth in. Most parents and children are familiar with tradition of the Tooth Fairy or other traditions that involve the exchange of a lost primary tooth for a prize or money. As may be appreciated, when a child loses a primary "baby" tooth the child or parent will place the tooth in the container and place the container under the child's pillow or nightstand. In some cases, the container may become hard to find when placed under the pillow or other area in the child's room. This is of importance when someone is trying to exchange the tooth for money or another prize. The container 100 forms a housing wherein the tooth or other item can be disposed by the participant (e.g., the child who has "lost" a tooth). Further, the container 100 contains money or another reward or prize which is disposed within the container 100 prior to or after the tooth has been deposited therein. In such, the money or other prize will be presented to the participant when the container 100 is opened after the tooth or other item has been deposited.

Figure 2:
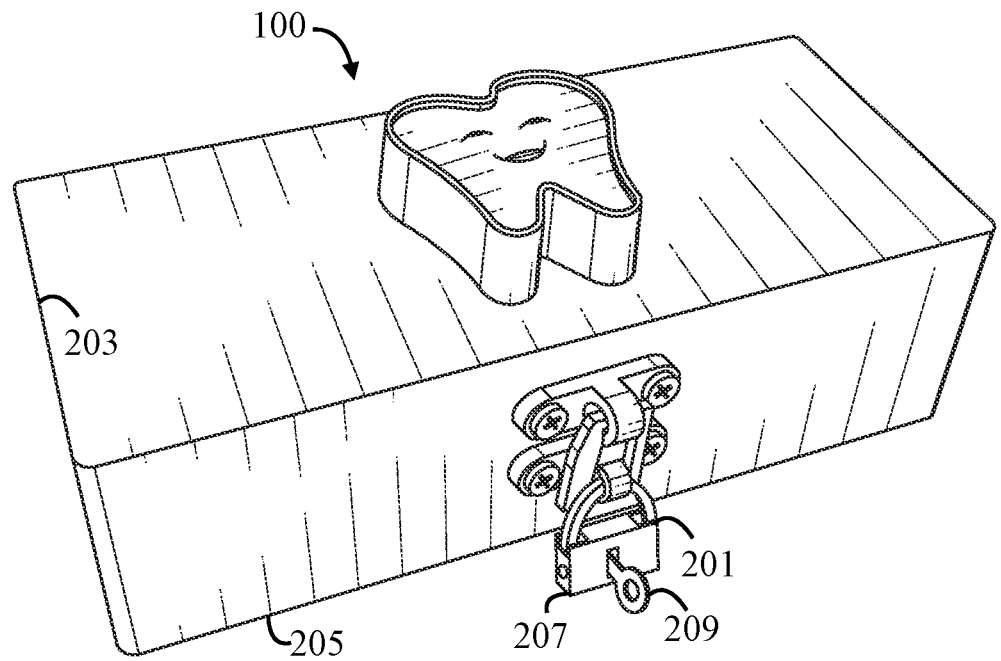
FIG. 2 illustrates a perspective view of the tooth container, according to some embodiments.

FIG. 2 is a picture of the Disappearing Tooth and Object Container 100 in accordance with some embodiments. As illustrated, the tooth and object container 100 may be rectangular (as shown in FIG. 2), square, circle, oval, or have the color, size, and shape of any other type of object. The container 100 includes a locking mechanism 201 to secure the upper container component 203 and lower container component 205 of the container 100. The locking mechanism 201 may include a lock 207 and key 209 to secure the upper container component 203 and lower container component 205 components. The upper and lower container components 203, 205 may be releasably engaged with one another to create an interior within the container 100. In such, the upper and lower container components 203, 205 have a complimentary perimeter to sufficiently seal the interior of the container 100 when closed.

Figure 3:
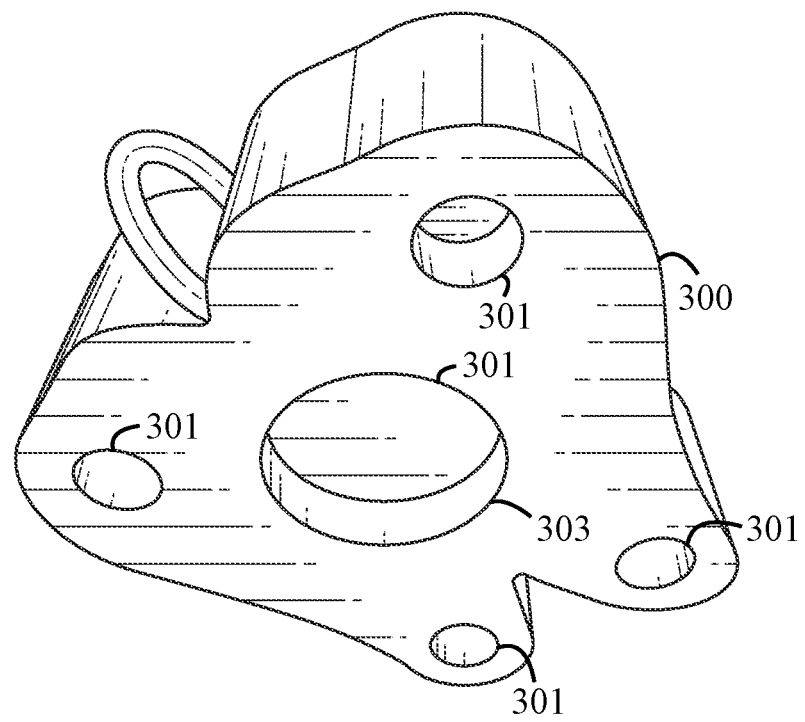
FIG. 3 illustrates a perspective view of the decorative ornament which may be placed on the outside of the tooth container, the underside of the container may include a plurality of cutouts for the placement of magnets, according to some embodiments.

FIG. 3 illustrates a decorative ornament 300 which may be releasably engaged of affixed to the container. In one example, the decorative ornament 300 includes one or more magnets to permit the releasable engagement with a surface of the container. Alternatively, the decorative ornament may include magnetic receivers to engage with magnets on the container. Attachment points 301 may be positioned on a bottom side 303 of the decorative ornament 300.

Figure 4:
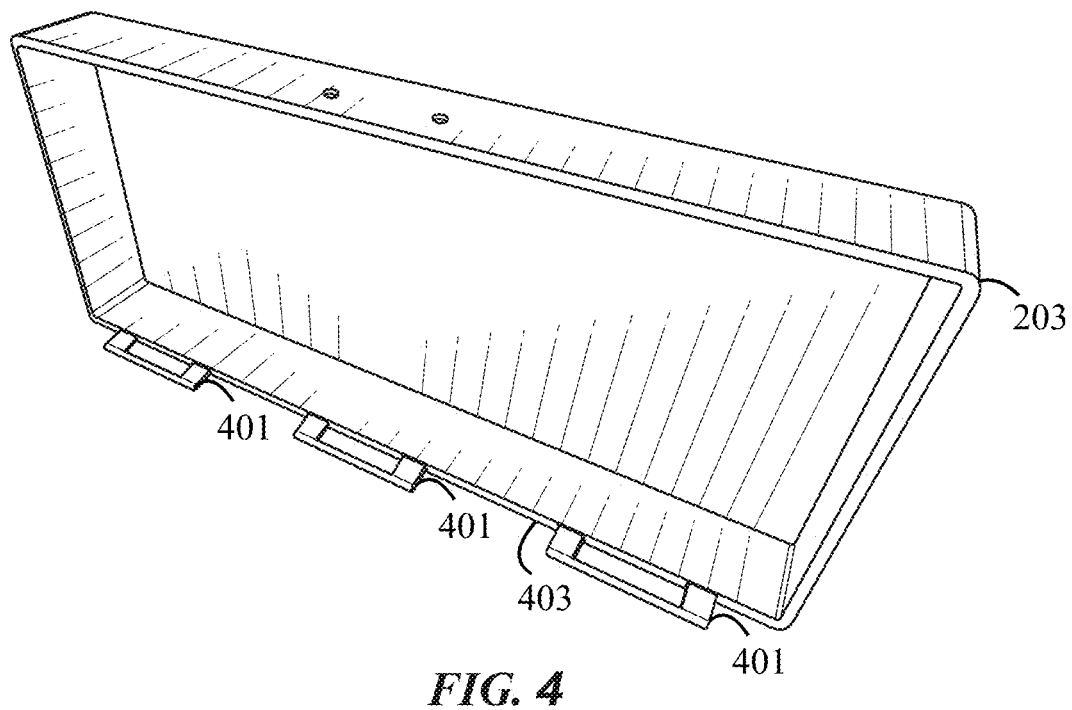
FIG. 4 illustrates a perspective view of the upper container component for the tooth and container, according to some embodiments.
Figure 5:
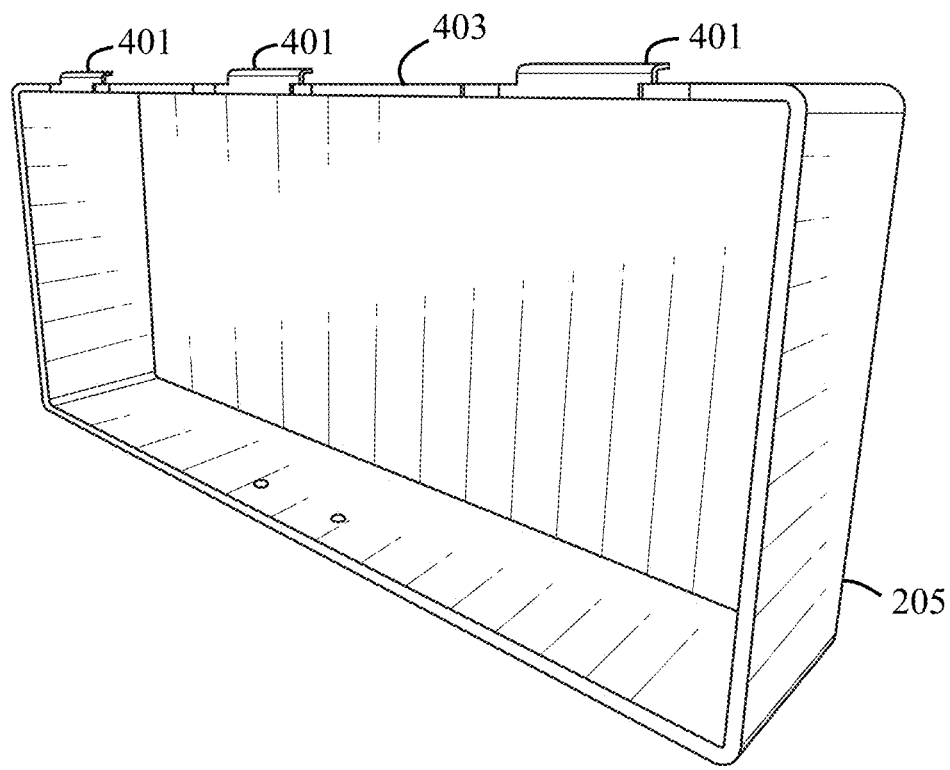
FIG. 5 illustrates a perspective view of the lower container component for the tooth and object container, according to some embodiments.

FIG. 4 illustrates the upper container component 203 while FIG. 5 illustrates the lower container component 205. Each of the upper and lower container components 203, 205 are pivotally engaged via complimentary hinge components 401. Hinge components are positioned on a rear side 403 of the container. Once connected, the upper and lower container components 203, 205 include create the interior cavity within the container wherein teeth, items, money and other rewards may be positioned.

In some embodiments, the container is connected without a hinge, such as via a friction fit, magnet system, or the like.

Figure 6:
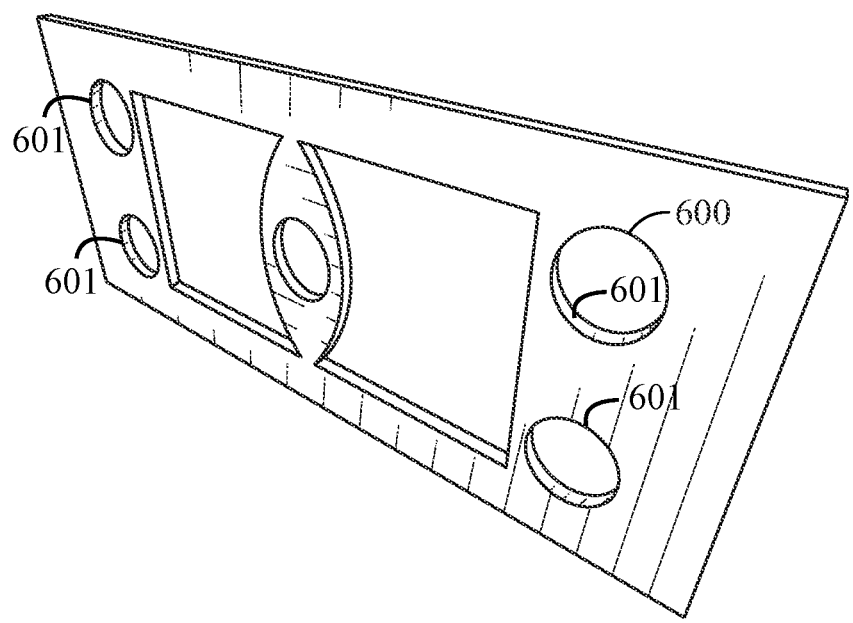
FIG. 6 illustrates a perspective view of the upper container insert without a lining material attached for the tooth container, according to some embodiments.

FIG. 6 illustrates an upper container insert 600 which is disposed within the container when assembled. The upper container insert 600 is added to the inside of the upper container component (as shown in FIG. 4). The upper container insert 600 may contain several cut outs of varying sizes and shapes that allow for the embedment of magnets 601 and other objects. The insert may be covered with the same liner material as the inside of the container components, or it may be covered by a different material. When the upper container insert 600 is covered with a liner material the cutouts in the insert and contents of the insert may be concealed. This upper container insert 600 can then be placed inside of the upper container component giving the illusion that the upper insert is the ceiling of the upper inner container. This upper container insert 600 may be held in place via magnetic forces between the embedded magnets in the upper insert and the magnets 601 embedded inside of the upper decorative ornament that may be placed on the outside of the container.

In some embodiments, when the upper container insert is held in place via this manner a separate compartment between the upper container component and upper insert may be formed. This compartment will be hidden from the inside portion of the upper and lower container components. This hidden compartment may allow for but not be limited to the storage of currency notes, coins, tickets, coupons, notes, or any other item.

Figure 7:
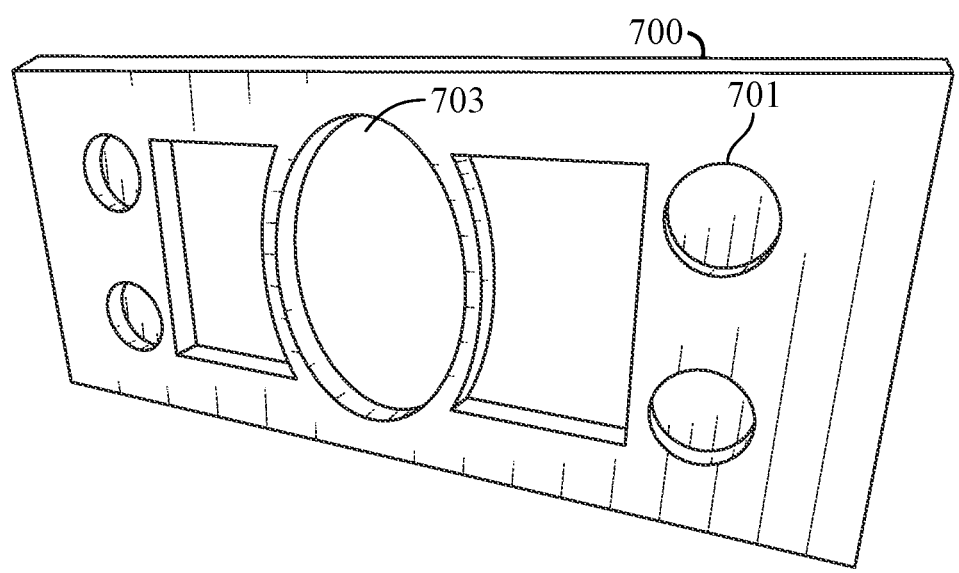
FIG. 7 illustrates a perspective view of the lower container insert without a lining material attached for the tooth container, according to some embodiments.

FIG. 7 illustrates a lower container insert 700 of varying sizes and configurations may be added to the inside of the lower container component. This lower container insert 700 may be permanently fixed to the inside of the lower container or the lower container insert 700 may be removable and secured via, magnets, hook-and-loop, snaps, or any other know fastening mechanism known in the arts to the section of the container. The lower container insert 700 may contain several cut outs of different designs that allow for the embedment of magnets 701 and a hollow concavity 703 that can be used to give space for concealment of a tooth or other object. The lower container insert 700 may be covered with the same liner materials as the inside of the container components. When the insert is covered with the liner the cutouts in the insert and contents of the insert may be concealed. The purpose of the cutout or hollow portions of both the upper and lower container inserts are but, not limited to, is to provide an area to conceal any object placed on these sections, allow the inserts to be lighter, and provide areas to embed magnets into the insert.

Figure 8:
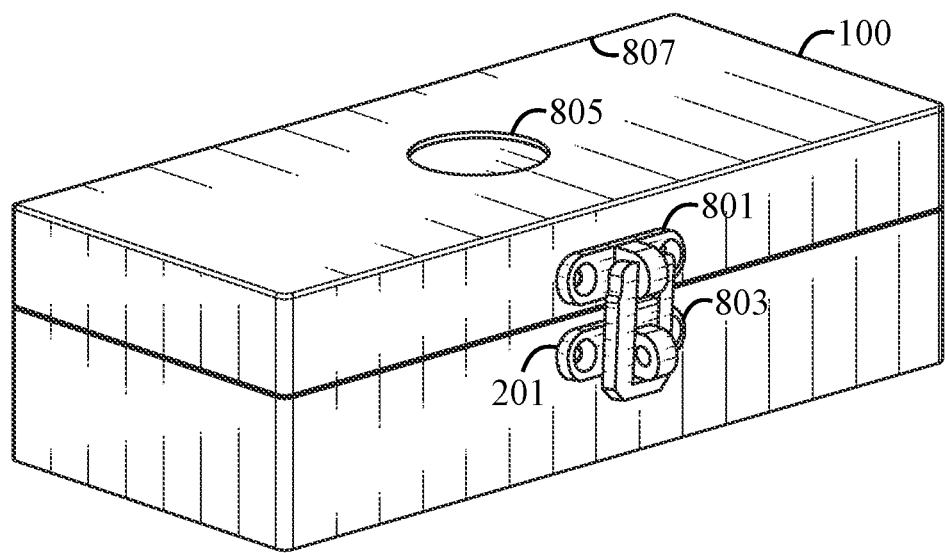
FIG. 8 illustrates a perspective view of the tooth container and locking mechanism to secure the upper and lower tooth container components, according to some embodiments.
Figure 9:
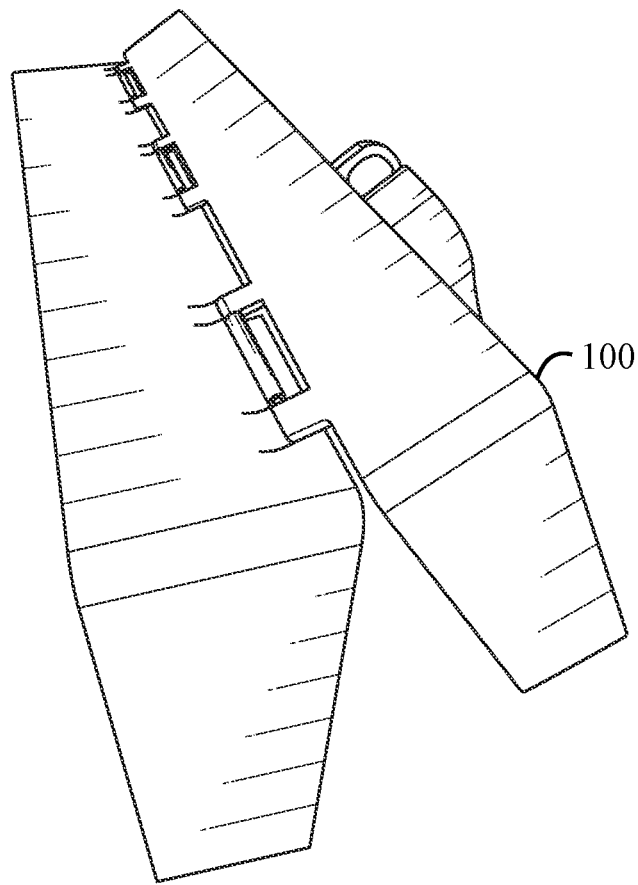
FIG. 9 illustrates a perspective view of the tooth container having a hinge to permit opening and closing of the tooth container, according to some embodiments.
Figure 10:
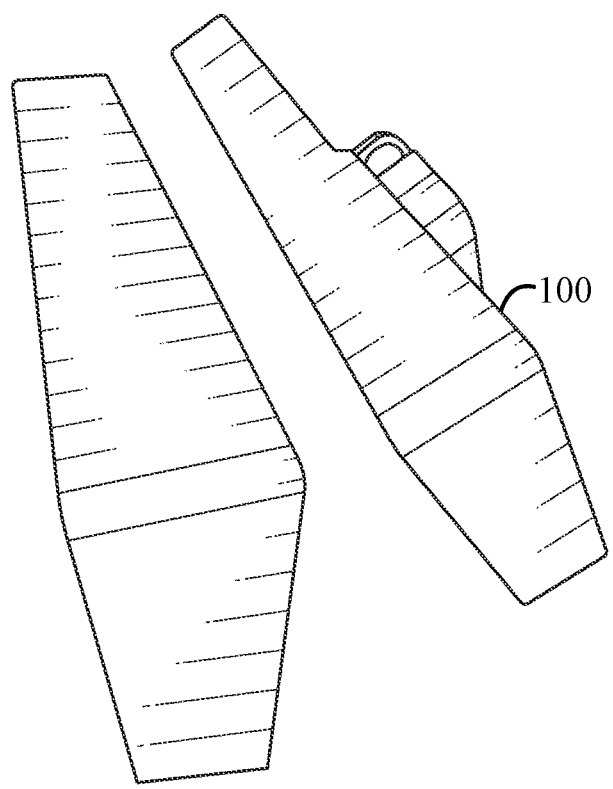
FIG. 10 illustrates a perspective view of the tooth container without a hinge wherein the upper and lower container components separate, according to some embodiments.

FIG. 8 illustrates a perspective view of the container 100 in a locked configured via the locking mechanism 201 illustrated as a latch having a top and bottom latch components 801, 803. The decorative ornament receiver 805 is provided on the top surface 807 of the container 100 to releasably interface with the decorative ornament. This receiver 805 may be a magnet, adhesive, magnetic surface, hook-and-loop, or similar component. FIG. 9 illustrates the container 100 in an open configuration such that the interior of the container 100. As described hereinabove, the container may open via a hinge mechanism, or without a hinge mechanism as illustrated in FIG. 10.

Figure 11:
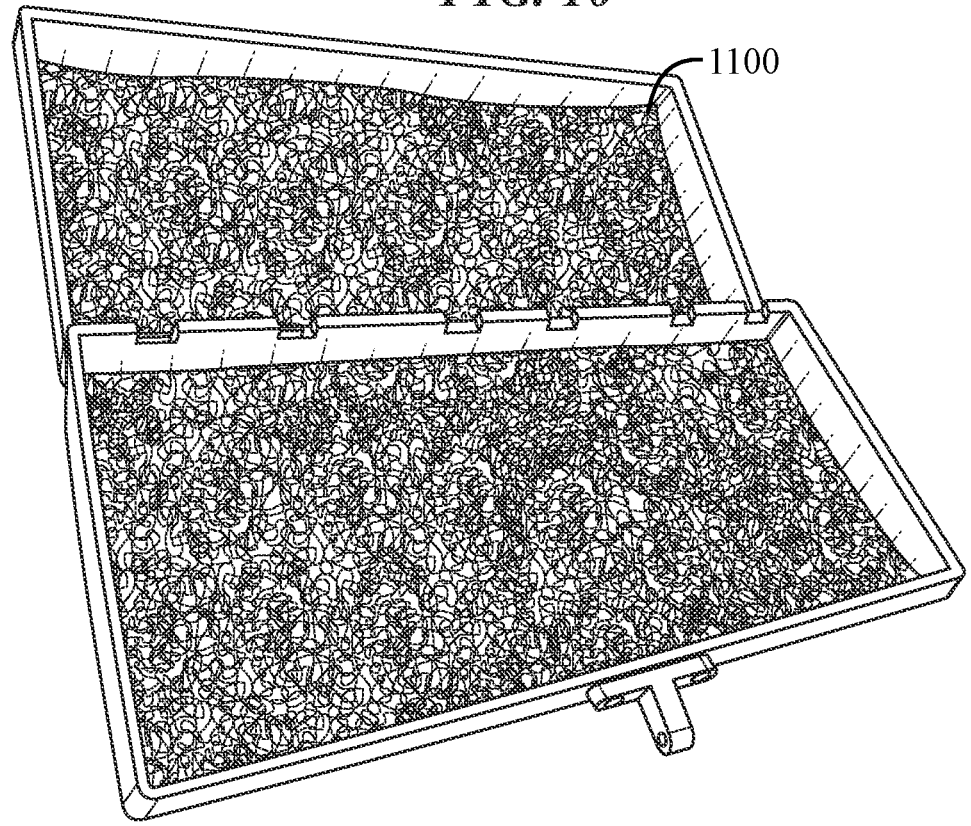
FIG. 11 illustrates a perspective view of the tooth container liner used to line the interior surfaces of the upper and/or lower tooth container components, according to some embodiments.

FIG. 11 illustrates the interior liner 1100. When the upper and lower container inserts come into contact with each other in the correct orientation the corresponding embedded magnets in the opposing inserts may allow for the two inserts to be connected together via the magnetic forces. This connection can be further enhanced if the interior liner 1100 is made of Velcro or another material that have the ability to adhere to opposing lining material. The hollow segments in both inserts may allow the insert liner material space or provide give in the liner material to conceal the object now placed in between the two joined inserts. When the two inserts are joined together the tooth or object is concealed and the contents of the hidden compartment placed between the upper container component and the once secured upper insert will now be revealed in the container.

In some embodiments, the inside of these container components may be lined completely or partially with a liner material such as felt, rubber, cloth, leather, vinyl, spandex, foam, hook-and-loop, or other material know in the arts.

Figure 12:
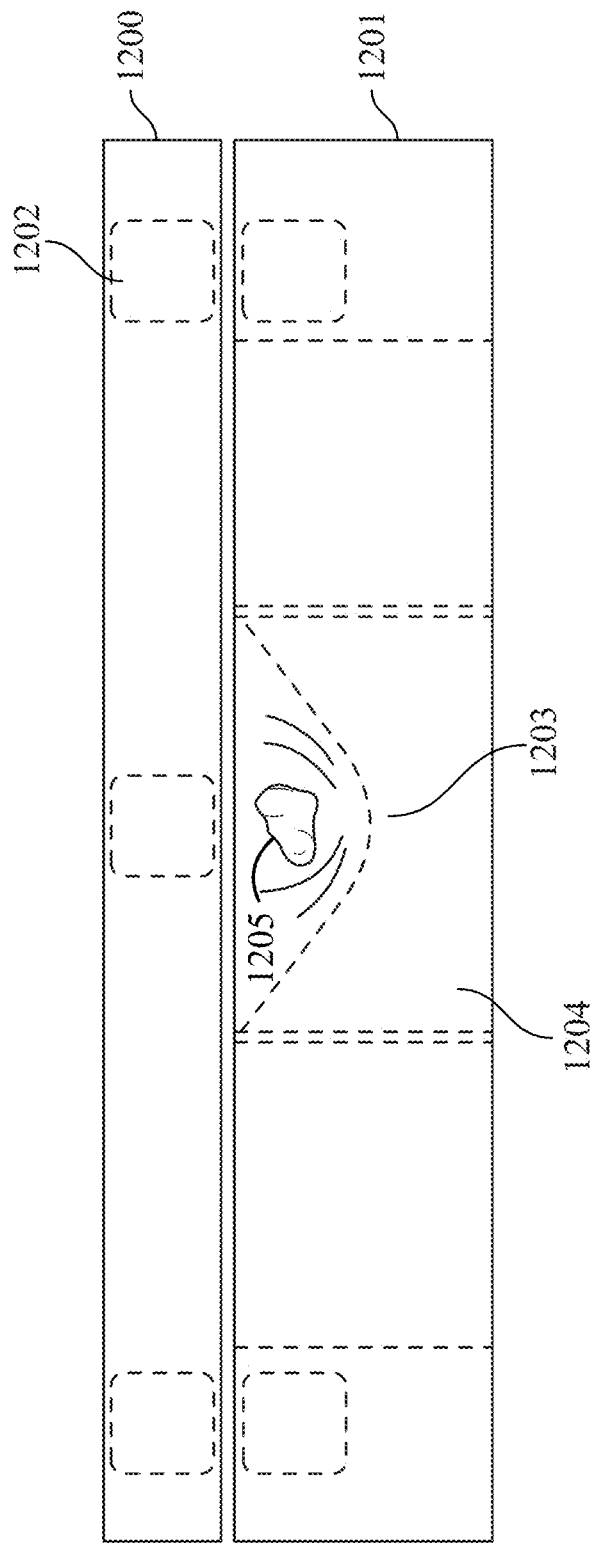
FIG. 12 illustrates a front elevation view of the upper and lower container inserts connected via the embedded magnets such that when the upper and lower container inserts are connected in this manor a hidden concavity can be created in between the two inserts and wherein the insert's hollow sections can allow space for an object such as a tooth to be concealed via the upper and lower container's hollow sections and insert lining material, according to some embodiments.

In reference to FIG. 12, when both inserts are placed and secured in their proper position the contents of the hidden compartment will be hidden and the tooth and object container will appear to be empty due to the matching liner material of the inserts and the inside of both the upper and lower container components. When a participant places a tooth or other object in the container the container can be than be closed with the object in the box. The container can be secured further by utilizing a lock mechanism of varying types on the container. When the container is secured immediately and in view of the participant the illusion that the contents is secure may be heighten. Once the tooth and object container is closed with the tooth or item 1205 1204 placed inside the decorative ornament that is securing the upper insert to the inside of the upper container component via the corresponding hidden magnets can be removed. This will cause the top insert 1200 to fall on top of the lower insert 1201. The corresponding embedded magnets 1202 in both inserts will secure the two inserts together concealing the object 1203 placed in between both insert's hollow segment 1204. The illusion can be further enhanced by attaching the key to the lock mechanism to the removable decorative ornament. Doing this will give a reason for the participant to remove the decorative ornament with the key to the lock mechanism. If one of the participants removes and keep the removable decorative ornament with the lock in a separate location the security of the box may appear to heighten, and this act will cause the upper insert to fall from the inside of the upper container component.

When the locked or unlock container is reopened by the participant the tooth or other object placed in the container will appear to be replaced with the hidden object that was previously placed in the container and is now uncovered. Thus, giving the illusion that the Tooth Fairy or someone else has secretively visited and exchanged the tooth or other object for a prize.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A tooth container comprising:
    a container having an upper container component and a lower container component moveably engaged to one another;
    an upper container insert applied to the upper container component to form a hidden compartment;
    at least one first magnet embedded in the upper container insert;
    a lower container insert applied to the lower container component, the lower container insert having a hollow concavity; and at least one second magnet embedded in the lower container insert, wherein when the upper container insert comes into contact with the lower container insert the at least one first magnet and the at least one second magnet magnetically attach the upper container insert to the lower container insert.

2. The tooth container of claim 1, further comprising a decorative ornament.

3. The tooth container of claim 2, wherein the decorative ornament is engaged with a top surface of the container.

4. The tooth container of claim 3, further comprising a third magnet positioned on a top surface of the upper container component, wherein the decorative ornament is releasably engaged via the third magnet.

5. The tooth container of claim 1, further comprising an item, wherein the container is dimensioned to receive the item, wherein the item is a tooth.

6. The tooth container of claim 5, further comprising a prize, wherein the container is dimensioned to receive the prize, wherein the prize is money.

7. The tooth container of claim 1, wherein the container includes a locking mechanism to selectively close the upper container component and the lower container component.

8. The tooth container of claim 1, wherein the upper container component and the lower container component are provided with a liner.

9. The tooth container of claim 1, further comprising a third magnet positioned on a top surface of the upper container component;
wherein the upper container insert is retained in position via the at least one first magnet and the third magnet.

10. The tooth container of claim 1, wherein the lower container insert is permanently affixed to the lower container component.

11. A tooth container comprising:
a selectively closeable container having an upper container component and a lower container component pivotally engaged via a hinge mechanism;
an upper container insert applied to the upper container component to form a hidden compartment between the upper container insert and the upper container compartment, the hidden compartment to store the prize;
at least one first magnet embedded in the upper container insert;
a lower container insert applied to the lower container component, the lower container insert having a hollow concavity; and
at least one second magnet embedded in the lower container insert, wherein when the upper container insert comes into contact with the lower container insert the at least one first magnet and the at least one second magnet magnetically attach the upper container insert to the lower container insert.

12. The tooth container of claim 11, further comprising a decorative ornament.

13. The tooth container of claim 12, wherein the decorative ornament is engaged with a top surface of the container.

14. The tooth container of claim 13, further comprising a third magnet positioned on a top surface of the upper container component, wherein the decorative ornament is releasably engaged via the third magnet.

15. The tooth container of claim 14, further comprising an item, wherein the container is dimensioned to receive the item, wherein the item is a tooth.

16. The tooth container of claim 15, further comprising a prize, wherein the container is dimensioned to receive the prize, wherein the prize is money.

17. The tooth container of claim 16, wherein the container includes a locking mechanism to selectively close the upper container component and the lower container component.

18. The tooth container of claim 17, wherein the upper container component and the lower container component are provided with a liner.

19. The tooth container of claim 18, further comprising a third magnet positioned on a top surface of the upper container component;
wherein the upper container insert is retained in position via the at least one first magnet and the third magnet.

20. The tooth container of claim 19, wherein the lower container insert is permanently affixed to the lower container component.

* * * * *